United States Patent
Kusakabe

(10) Patent No.: US 8,379,249 B2
(45) Date of Patent: Feb. 19, 2013

(54) FORWARDING PRINT JOB AND DRIVER INFORMATION FROM A FIRST IMAGE FORMING APPARATUS TO A SECOND IMAGE FORMING APPARATUS

(75) Inventor: Yuki Kusakabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1127 days.

(21) Appl. No.: 12/274,241

(22) Filed: Nov. 19, 2008

(65) Prior Publication Data

US 2009/0128853 A1 May 21, 2009

(30) Foreign Application Priority Data

Nov. 20, 2007 (JP) .................... 2007-300759

(51) Int. Cl.
 *G06F 3/12* (2006.01)
(52) U.S. Cl. ........................................ 358/1.15
(58) Field of Classification Search ............... 358/1.15
 See application file for complete search history.

(56) References Cited

U.S. PATENT DOCUMENTS

| RE39,801 E * | 8/2007 | Marbry et al. ........... 709/220 |
| 8,185,887 B2 * | 5/2012 | Hattori ........................ 717/174 |
| 2002/0159807 A1 * | 10/2002 | Ishida ........................... 400/76 |
| 2002/0186407 A1 * | 12/2002 | Laughlin ................... 358/1.15 |
| 2005/0030574 A1 | 2/2005 | McVey |

FOREIGN PATENT DOCUMENTS

| JP | 2001-056756 A | 2/2001 |
| JP | 2002-189578 A | 7/2002 |
| JP | 2006-305760 A | 11/2006 |

* cited by examiner

*Primary Examiner* — Benny Q Tieu
*Assistant Examiner* — Eric A Rust
(74) *Attorney, Agent, or Firm* — Canon U.S.A., Inc. IP Division

(57) ABSTRACT

An information-processing apparatus includes a print-job-transmission unit operable to transmit a print job to a first image-processing apparatus, and a driver-information-transmission unit configured to transmit at least one driver-information item including a driver list which is the list of at least one driver existing on the information-processing apparatus to the first image-processing apparatus upon receiving cancellation information indicating that the transmitted print job is cancelled by the first image-processing apparatus.

3 Claims, 13 Drawing Sheets

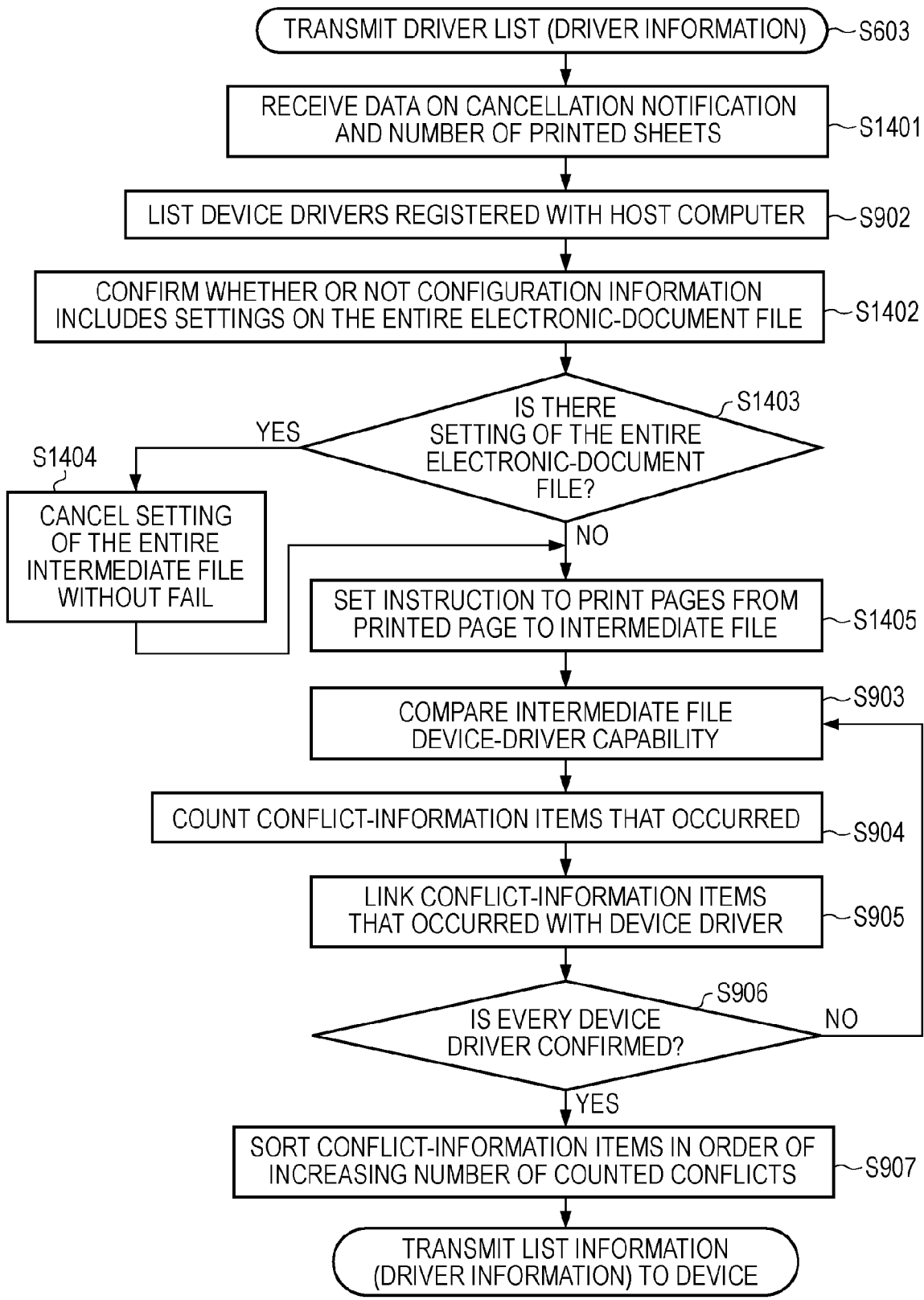

FORWARDING PRINT JOB AND DRIVER INFORMATION FROM A FIRST IMAGE FORMING APPARATUS TO A SECOND IMAGE FORMING APPARATUS

BACKGROUND OF THE INVENTION

1. Field of the Invention

The present invention relates to a network-printing technology provided to instruct a device to perform printing. When the printing is not executed for some reason, the network-printing technology allows for instructing a different device to perform the printing again.

2. Description of the Related Art

When a user instructs a device to perform printing from a host computer and goes to the device to take a printed matter, the user often finds that the printing is not done. Here, the device denotes every image-forming apparatus. Further, the host computer denotes every information-processing apparatus.

There are various reasons for the printing which is not done. For example, print jobs are accumulated in the device so that the user's turn has not come yet, or it is difficult to start the printing for a device error.

If it is difficult to easily solve the above-described problems and start the printing immediately, it will take a long time and troubles. More specifically, the user obtains the printed matter by performing the processing procedures including cancelling the print job through the device instructed to perform the printing by the user, going back to the host computer, and instructing a different device to perform the printing.

Performing the above-described processing procedures takes a long time and troubles, since the user has to move between the processing procedures. For omitting the above-described processing procedures and simplifying reprinting, an automatic-vicarious-printing technology and/or a remote-copying technology have been provided.

According to the automatic-vicarious printing, a host computer confirms the state of the device before the printing is performed and automatically transmits a print job to a device which is an alternative destination, as disclosed in Japanese Patent Laid-Open No. 2006-305760.

According to the remote-copying technology, a spooled job is transferred from the device to a different device, as disclosed in Japanese Patent Laid-Open No. 2002-189578.

Further, if it is difficult to transmit received print data to a printer which is an output destination specified by a client machine during the automatic-vicarious printing, a printer server searches for an alternative printer by using a printer list managed inside the printer server.

Japanese Patent Laid-Open No. 2001-056756 discloses a network-print system configured to transmit a print job to a printer that is searched as an alternative printer and that has the same capability as that of a printer which received the first print instruction.

The above-described printer list is managed on a server so that the registration of a new printer and/or the changing of the printer list is performed on the server.

Further, Japanese Patent Laid-Open No. 2001-056756 also discloses a system which issues a print instruction from a client machine including a server having the above-described printer list so that alternative printing can be performed through a printer registered with the printer list without using the server.

However, the automatic-vicarious printing is performed under certain restrictions. For example, an alternative device has to be determined in advance, or the alternative device has to be the same model as the printer originally specified by the client machine.

For achieving the remote copying, an original device which is the device that received the first print instruction has to grasp the address of a device provided at the transfer destination. Further, it is uncertain whether a user who issued the print instruction knows the location of the device provided at the transfer destination.

Although a client machine including a server having a device list is used, it is uncertain whether the user who issued the print instruction knows the place where a device registered with the device list is installed and/or the capability of the device.

Further, when the host computer instructs devices to perform printing, page-description languages (PDL) compatible with the drivers of the individual devices are used. Therefore, a drawing method itself, the drawing method being used in an application, may be changed.

In that case, the print instruction is transmitted from an application provided on the host computer to the device via the driver, which is the most appropriate method of transmitting the print instruction for the device.

SUMMARY OF THE INVENTION

Accordingly, the present invention has been achieved, so as to save a user from having to go back to a host computer and perform reprinting by cancelling a first print instruction issued from the user on a device which received the first print instruction and issuing a reprint instruction to a different device at the same time.

Therefore, an information-processing apparatus according to an aspect of the present invention includes a print-job-transmission unit operable to transmit a print job to a first image-processing apparatus, and a driver-information-transmission unit configured to transmit at least one driver-information item including a driver list which is a list of at least one driver existing on the information-processing apparatus to the first image-processing apparatus upon receiving cancellation information indicating that the transmitted print job is cancelled by the first image-processing apparatus.

Further, according to another aspect of the present invention, there is provided an image-processing apparatus including a print-job-acquisition unit configured to receive a print job transmitted from an information-processing apparatus, a print-job-execution unit configured to execute the acquired print job, and a job-cancellation-information-notification unit configured to notify the information-processing apparatus which is a transmission source of the print job that the print job is cancelled in a case that image data is cancelled before the print job is executed by the print-job-execution unit, the image-processing apparatus including a driver-information-reception unit configured to receive driver information transmitted from the information-processing apparatus, the driver information including a driver list which is a list of at least one driver existing on the information-processing apparatus, a display unit configured to display the driver list, a print-job-transfer unit configured to transfer the print job to a different image-processing apparatus corresponding to a driver selected from the displayed driver list in a case that the print job is compatible with the different image-processing apparatus and to transfer the print job to the information-processing apparatus in a case that the print job is not compatible with the different image-processing apparatus corresponding to the selected driver.

Further features of the present invention will become apparent from the following description of exemplary embodiments with reference to the attached drawings.

BRIEF DESCRIPTION OF THE DRAWINGS

FIG. 14 is a flowchart showing details on the transmission of a driver list (driver information) in the case where the job cancellation is made during the execution of printing.

DESCRIPTION OF THE EMBODIMENTS

Hereinafter, embodiments of the present invention will be described with reference to the attached drawings.

Figure 1:
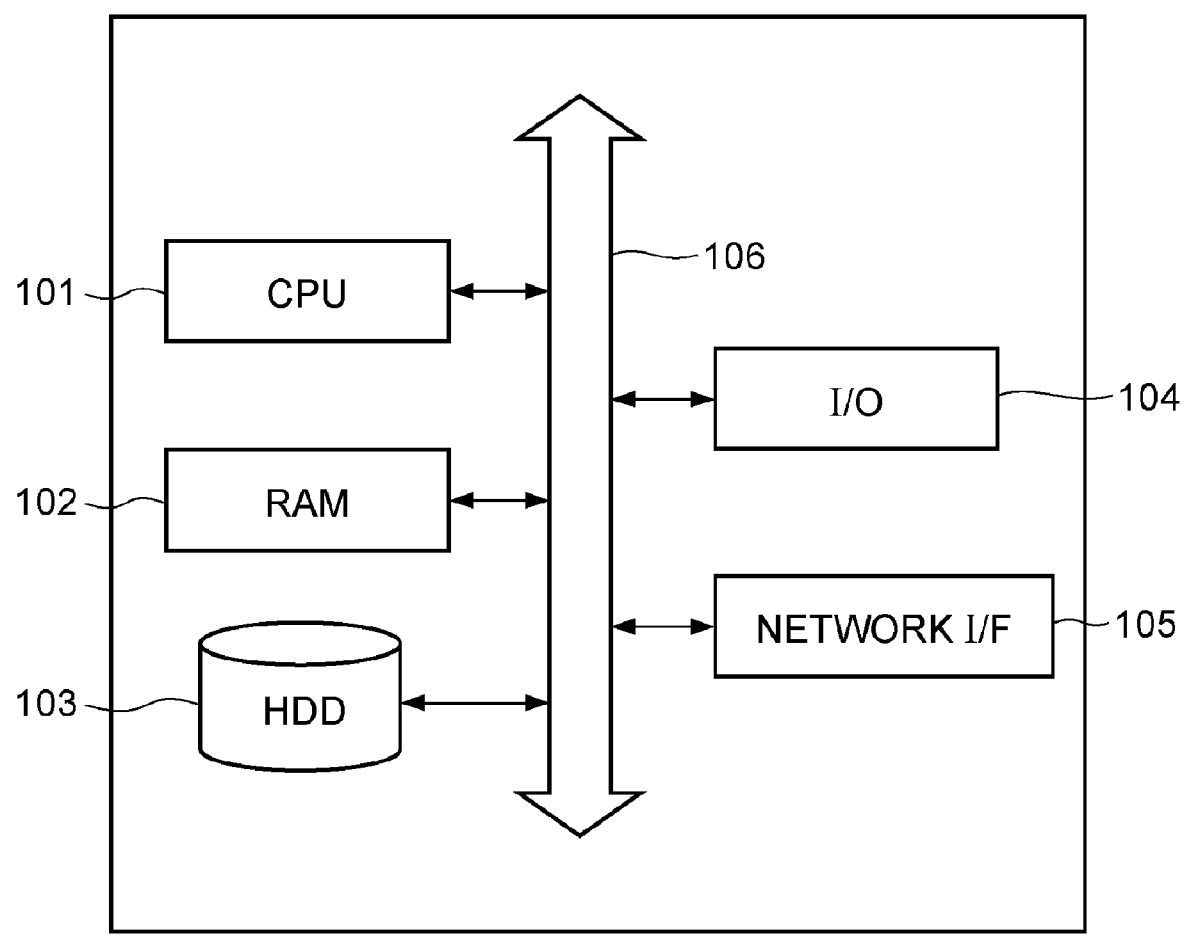
FIG. 1 shows a host computer.
Figure 2:
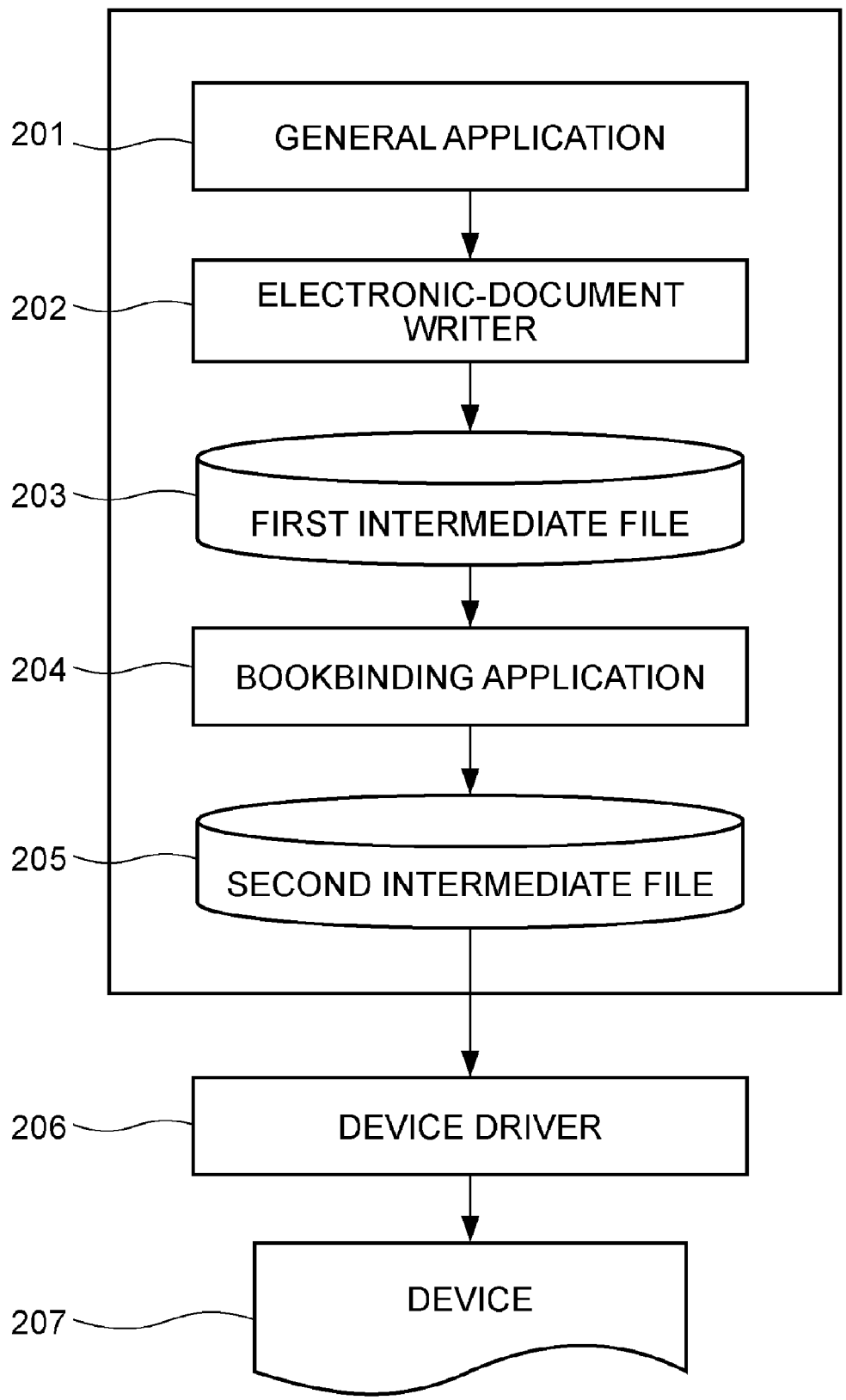
FIG. 2 is a diagram showing the configuration of an application.

FIG. 1 is a block diagram showing the hardware of a host computer. A central-processing unit (CPU) 101 executes programs including an operating system, a general application, a bookbinding application, etc., the programs being loaded from a hard-disk drive (HDD) 103 to a random-access memory (RAM) 102. Further, the CPU 101 achieves a software configuration including a general application 201, an electronic-document writer 202, a bookbinding application 204, and a device driver 206 that are shown in FIG. 2. Further, the CPU 101 executes processing procedures shown in flowcharts that will be described later.

Further, the CPU 101 collectively controls individual pieces of hardware connected to a system bus 106. An input/output (I/O) device 104 controls key-input data entered through a keyboard and/or a pointing device that is not shown. A network interface (I/F) 105 transmits and/or receives a signal to and/or from a device connected thereto.

FIG. 2 shows the software configuration of a document-processing system. The document-processing system is achieved by a host computer which is an embodiment of an information-processing apparatus of the present invention.

The general application 201 is an application program offering functions including a word-processing function, a spread-sheet function, a photo-retouch function, a drawing function, a painting function, a presentation function, a text-editing function, etc. The general application 201 has a print function provided for the OS.

The above-described applications use a predetermined interface presented by the OS (usually referred to as a graphic-device interface (GDI)), so as to output application data including generated document data, generated image data, etc.

Namely, the general application 201 transmits output-command data (referred to as a GDI function) generated in a format depending on a predetermined OS to an output module of the OS presenting the above-described interface, so as to output and print generated data.

On the other hand, the output module that received the output-command data converts the output-command data into output-command data (referred to as a device-driver interface (DDI) function) generated in a format specified to allow an output device such as a printer to process the generated output-command data, and transmits the output-command data to the output device.

Since the format specified to allow the output device to process the output-command data varies depending on the type, the manufacturer, the model, etc. of the output device, device drivers are provided for individual devices. The OS converts command data by using the above-described device drivers so that print-data items are generated.

The print-data items generated in the above-described manner are put together by using a job language (JL) so that a print job is generated.

In the case where a Windows of Microsoft Corporation is used, as the OS, a module referred to as a GDI is used, as the above-described output module.

The electronic-document writer 202 is a modification of the above-described device driver, and is a software module presented to achieve the above-described document-processing system. However, the electronic-document writer 202 is not intended for converting the output-command data into data that can be output only to a predetermined output device. Namely, the electronic-document writer 202 converts the output-command data into data generated in a format which allows the bookbinding application 204 and/or the device driver 206 (described later in detail) to process the converted data.

The data converted by the electronic-document writer 202 is determined to be a first intermediate file 203 referred to as an electronic-document file. The electronic-document file is generated in a format determined so that a document generated in pages can be expressed in a detailed style. For example, PDF format and/or SVG format provided by Adobe Systems Incorporated is used, as the substantial standard format of the electronic-document file.

In the case where the electronic-document writer 202 is used through the general application 201, the electronic-document writer 202 is specified, as a device driver used to output data, and print processing including the print-data generation, the print-job generation, and outputting-and-printing processing is executed.

Here, the print-data generation denotes performing the command conversion through the bookbinding application 204 for the electronic-document file.

The print-job generation is achieved by a printer driver which had received the print-data items. Namely, the above-described printer driver puts together the print-data items through the JL and transmits data on a result of the above-described processing to a device. The outputting-and-printing processing denotes outputting the print job to a medium such as a sheet of paper.

However, the electronic-document file which is the first intermediate file 203 generated by the electronic-document writer 202 does not have a sufficient format, as the electronic-document file.

Then, the bookbinding application 204 adds structure information (described later) to the imperfect electronic-document file, which is the first intermediate file 203 generated by the electronic-document writer 202, whereby a second intermediate file 205 is completed.

Therefore, the bookbinding application 204 specifies the electronic-document writer 202, as the device driver, and the application data is converted into an electronic-document file under the control of the electronic-document writer 202.

Hereinafter, the electronic-document file generated by the electronic-document writer 202 is referred to as the first intermediate file 203, so as to clearly identify the electronic-document file converted under the control of the electronic-document writer 202.

Then, the intermediate file generated by adding the structure information to the electronic-document file, which is the first intermediate file 203, by the bookbinding application 204 is referred to as the second intermediate file 205.

Figure 3:
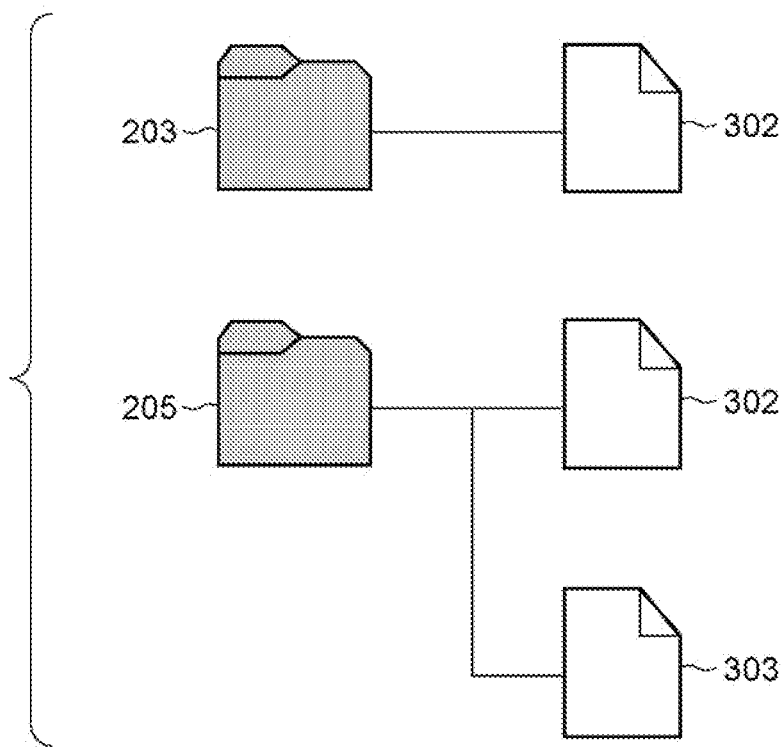
FIG. 3 is a diagram showing the configuration of an intermediate file.

FIG. 3 schematically shows an example conceptual format of the intermediate file. According to the second intermediate file 205 shown in FIG. 3, structure information 303 is linked to an electronic-document file 302, which is the first intermediate file.

Thus, the electronic-document writer 202 is specified, as the device driver, and data is introduced into a print-processing operation through the general application 201 so that the application data is converted into the first intermediate file 203 defined by the general application 201.

Then, the above-described first intermediate file 203 is stored in a storage medium such as the HDD 103, as the electronic-document file 302.

Here, the HDD 103 may be a local driver provided in a computer achieving the document-processing system of the above-described embodiment. If the HDD 103 is connected to a network, the HDD 103 may be a drive presented on the network.

The bookbinding application 204 reads the electronic-document file 302, which is the first intermediate file 203, and presents a function of editing the structure information 303 of the electronic-document file 302 to a user.

Then, the electronic-document file 302, which is the first intermediate file 203, becomes the second intermediate file 205 having the structure information 303, and is stored in a storage medium such as the HDD 103.

For outputting and printing the second intermediate file 205 having the structure information 303 edited by the bookbinding application 204, the device driver 206 is specified through the bookbinding application 204, and the second intermediate file 205 is read from the HDD 103.

Then, for performing the outputting-and-printing processing in a format written in the above-described second intermediate file 205, the bookbinding application 204 generates an output command ready for the above-described output module of the OS.

After that, the device driver 206 converts the generated output command into a command written in a page-description language or the like so that the command can be interpreted and executed by a device 207 used as an output device.

Then, the converted command is transmitted from the device driver 206 to the device 207, and the device 207 outputs and prints an image generated in accordance with the command.

Figure 4:
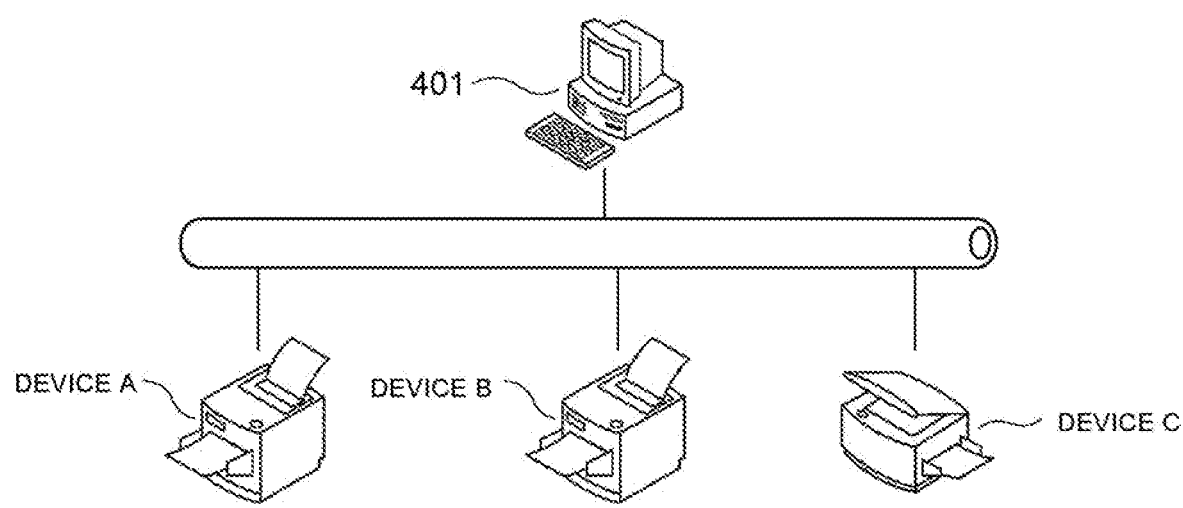
FIG. 4 is a diagram showing the entire configuration.

FIG. 4 is a diagram showing the entire configuration of an embodiment of the present invention. In FIG. 4, a host computer 401 is connected to device A, device B, and device C via a network through which command communications can be performed, where each of device A, device B, and device C is an image-processing apparatus such as a printer. Further, the device A and device B are connected to a communication network through which the command communications can be performed.

The device C should be connected to the host computer 401 via a network through which the device C can communicate with the host computer 401. The device C may be connected to a communication network through which a communication with the device A and/or the device B can be performed.

Thus, the entire configuration of the embodiment of the present invention is achieved by using at least two image-processing apparatuses including the first image-processing apparatus and the second image-processing apparatus.

Figure 5:
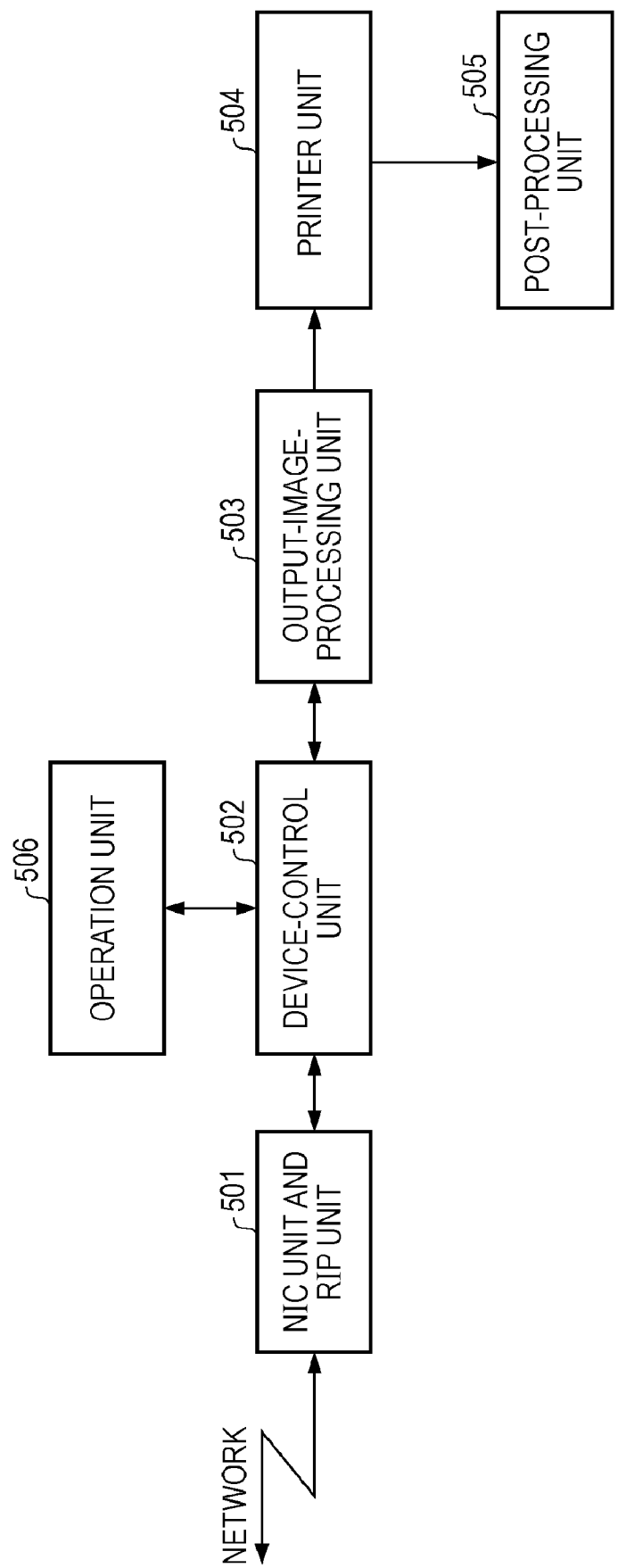
FIG. 5 is a diagram showing the configuration of a device.

FIG. 5 is a block diagram showing the minimum configuration of each of device A, device B, and device C that are provided to achieve the above-described embodiment. In a network interface card (NIC) unit-and-raster image processor (RIP) unit 501, the NIC unit transmits the command written in the page-description language or the like to the RIP unit, where the command is transmitted from the device driver through the network.

Further, the NIC unit externally transmits image data and/or apparatus information existing in a multi-function printer (MFP) via the network.

The RIP unit interprets the transmitted command written in the page-description language and performs RIP expansion.

Next, the transmitted data is transferred to a device-control unit 502. The device-control unit 502 performs traffic control, so as to control transmitted data and/or data externally transmitted. Further, the image data transmitted to the device-control unit 502 is temporarily stored in a memory. The temporarily stored image data is called up, as required.

An output-image-processing unit 503 performs image processing for the transmitted data, so as to output and print the data, and transmits the data to a printer unit 504.

In the printer unit 504, sheets are fed and image data generated by the output-image-processing unit 503 is printed on the sheets in order. The sheets on which the image data is printed are output and transferred to a post-processing unit 505, so as to be subjected to classification processing and/or finish processing.

An operation unit 506 is provided to perform processing procedures according to various flows, the function selection, or the operation instruction.

The operation unit 506 displays the list of jobs on which data is stored by the device-control unit 502, an instruction to cancel a displayed job, or an application started by the device-control unit 502. An application operating in the device-control unit 502 can be started according to an instruction issued from the operation unit 506.

Figure 6:
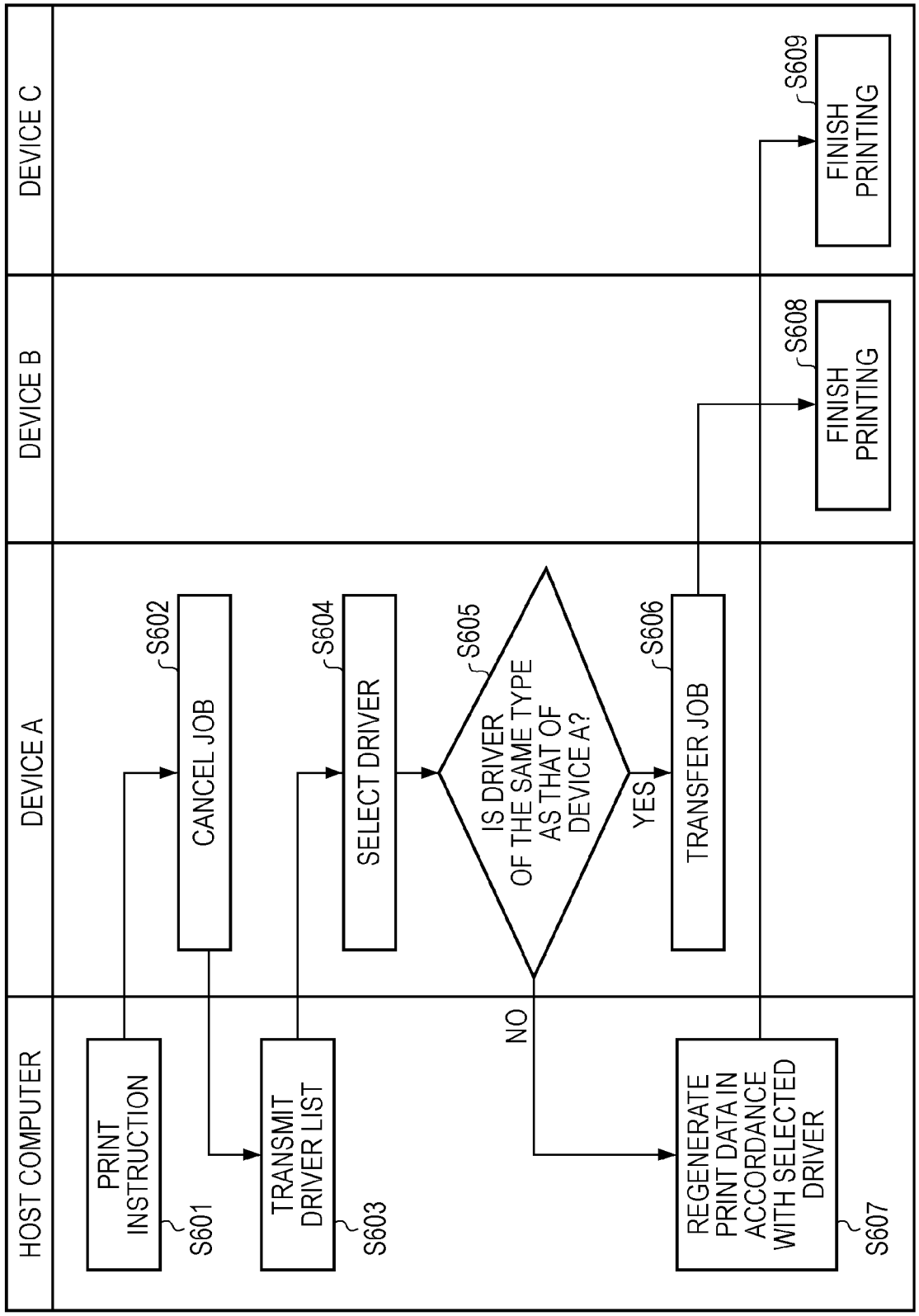
FIG. 6 is a flowchart showing the entire flow of an embodiment of the present invention.

FIG. 6 shows the entire flow of some embodiments of the present invention. At step S601, the host computer 401 transmits a print job and a print instruction to the device A, so as to make the device A executes print processing. Consequently, the print processing is started.

In the device A, which is the transmission destination of the above-described print job and the first device that acquired the print job, spools data on the print job received by the device-control unit 502.

Then, the device A having the spooled data is instructed by the user to cancel the instruction to execute the print job through the operation unit 506.

The above-described cancellation may be made in the case where print jobs are accumulated, a device error occurs, etc., as described in "Description of the Related Art".

At step S602, the operation unit 506 of the device A which had received information about the print-job cancellation transmits the cancellation information to the device-control unit 502. Upon receiving the cancellation information, the device-control unit 502 transmits the cancellation information to the host computer 401 which had transmitted the print job.

Upon receiving the cancellation information, the host computer 401 transmits driver information to the device A, where the driver information includes data on the list of drivers of the devices, where the drivers are owned by the host computer 401.

The driver list is the same information as information viewed at the time where the host computer 401 manages the devices, for example.

Therefore, the user who had transmitted the print job from the host computer 401 to the device can grasp the functions of the device compatible with the driver written on the driver list by viewing the driver list. Consequently, the user can select the driver while expecting the output result. Further, the user can understand the location where the device compatible with the driver is installed. The above-described driver information will be described later.

At step S604, the driver list transmitted to the device A at the time when the host computer 401 performs the driver-information transmission is displayed on the operation unit 506.

Further, at the same time, candidates for a driver used for a device picked up as the transfer destination (the list of registered drivers), the candidates being registered with the device A by a serviceman and/or the system administrator, is displayed on the operation unit 506.

Then, the user is made to select a driver from the list, where the driver instructs to perform the reoutputting-and-reprinting processing. After the user selects the driver, the operation unit 506 of the device A receives information transmitted from the user, the information indicating the selected driver.

Then, the operation unit 506 transmits the transmitted information to the device-control unit 502 of the device A.

Upon receiving the above-described information at step S605, the device-control unit 502 determines whether the selected driver is the same model as a driver used for the device A.

If the selected driver is the same model as the driver used for the device A, the selected driver shares print functions with the above-described driver. In that case, no conflict occurs between structure information that can be handled by the selected driver and structure information that can be handled by the device A. If a difference occurs between the structure information that can be handled by the selected driver and the structure information that can be handled by the device A, a conflict occurs, which makes it difficult to perform the outputting-and-printing processing in accordance with the instruction.

If the selected driver is the same model as the driver used for the device A, the processing advances to step S606 so that the spooled data is directly transmitted to the device B compatible with a driver which is the same model as the driver of the device A.

Then, the print data is transmitted to the device B so that the outputting-and-printing processing is executed by the device B at step S608.

On the other hand, if the driver is not the same model as the driver used for the device A, the processing advances from step S605 to step S607 so that the device A informs the host computer 401 of the driver selected by the user.

At step S607, the host computer 401 regenerates the print data through the bookbinding application 204 in accordance with the driver selected by the device A.

Consequently, at step S609 the outputting-and-printing processing is executed by the device C compatible with the driver which is not the same model as the driver of the device A.

Hereinafter, processing procedures described in the individual flowcharts will be described.

Figure 7:
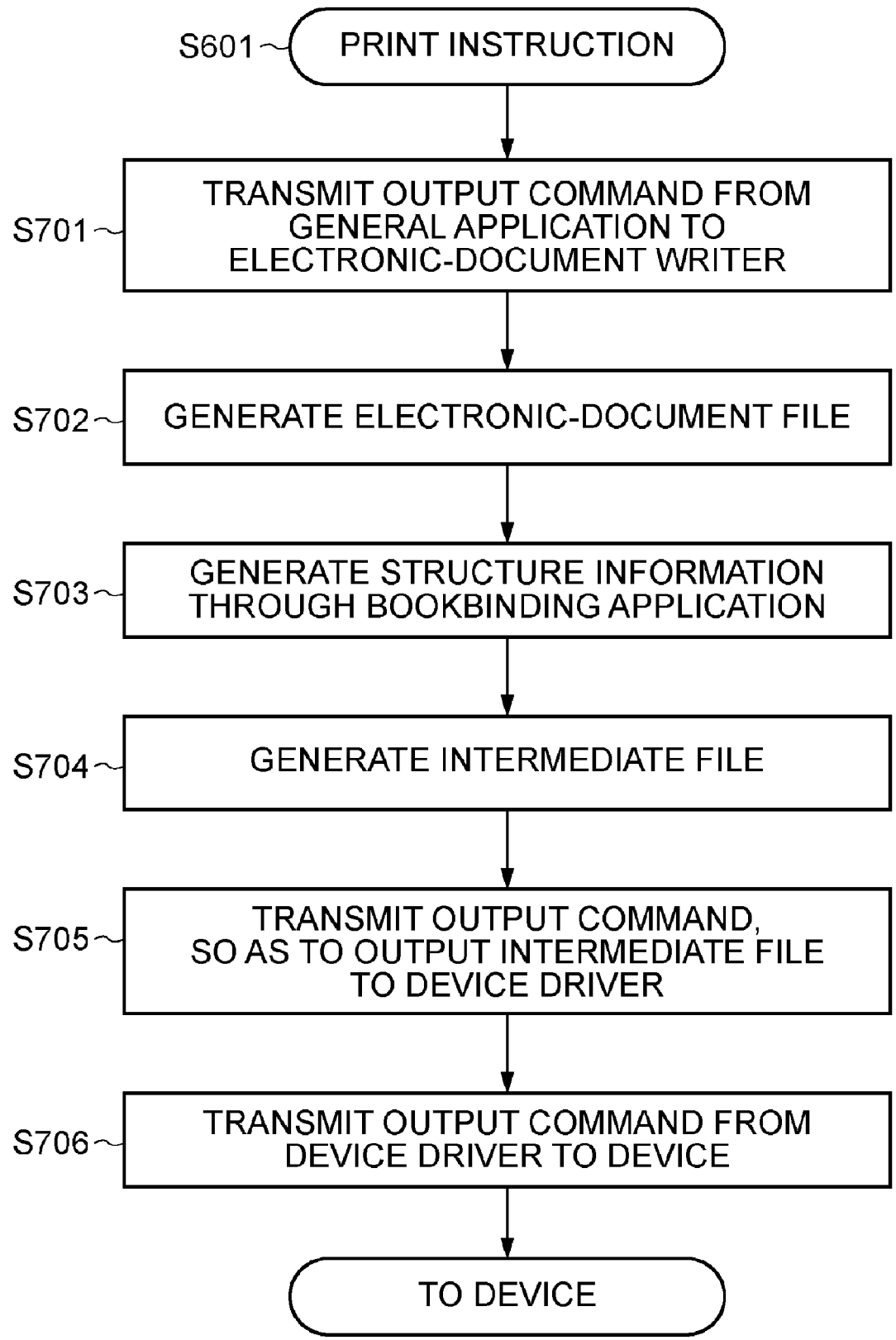
FIG. 7 is a flowchart showing details on a print instruction.

Details on the print instruction issued at step S601 are illustrated in a flowchart of FIG. 7. The host computer 401 receives the print instruction transmitted from the user. Upon receiving the print instruction, the host computer 401 transmits the print instruction to the general application 201, so as to generate the print data. In the first place after receiving the print instruction, the general application 201 transmits data to the electronic-document writer 202 through GDI outputting, at step S701. Then, the data transmitted through the GDI outputting is converted into DDI data and transmitted to the electronic-document writer 202.

Consequently, the electronic-document file 302, which is the first intermediate file, is generated at step S702, and the bookbinding application 204 reads the electronic-document file 302.

Then, at step S703, the structure information 303 used by the device driver 206, the structure information 303 being obtained through the bookbinding application 204, is generated based on the structure information transmitted from the user.

The bookbinding application 204 generates the second intermediate file 205 at step S704 based on the generated structure information 303.

Then, at step S705, the bookbinding application 204 outputs the second intermediate file 205 generated at step S704 to the device driver 206 through the GDI outputting. After that, at step S706, the device driver 206 transmits an output command to the device 207.

Next, details on the job cancellation performed at step S602 will be described in a flowchart of FIG. 8. At step S801, the output command transmitted from the host computer 401 is transmitted to the NIC unit 501 of the device A and data on the output command is converted into a print job in the RIP unit 501.

Then, the print job is transmitted to the device-control unit 502 at step S802. The transmitted print job is spooled by the device-control unit 502 at step S803.

The spooled print job is confirmed by the user through the operation unit 506 of the device A.

Then, the user cancels the spooled print job through the operation unit 506 of the device A at step S804.

Then, the operation unit 506 receives information indicating the cancellation, and transmits the received information to the control unit 502 of the device A.

Then, the control unit 502 of the device A checks with the user for confirming whether the cancelled print job is output and printed through a different device at step S805. If the print job is output and printed by the different device, the processing advances to step S806.

At that time, the device-control unit 502 transmits a cancellation notification to the host computer 401 which is the transmission destination of the cancelled job.

At that time, the cancelled print job existing on the device A is not yet deleted, but stored inside (spooler).

Figure 9:
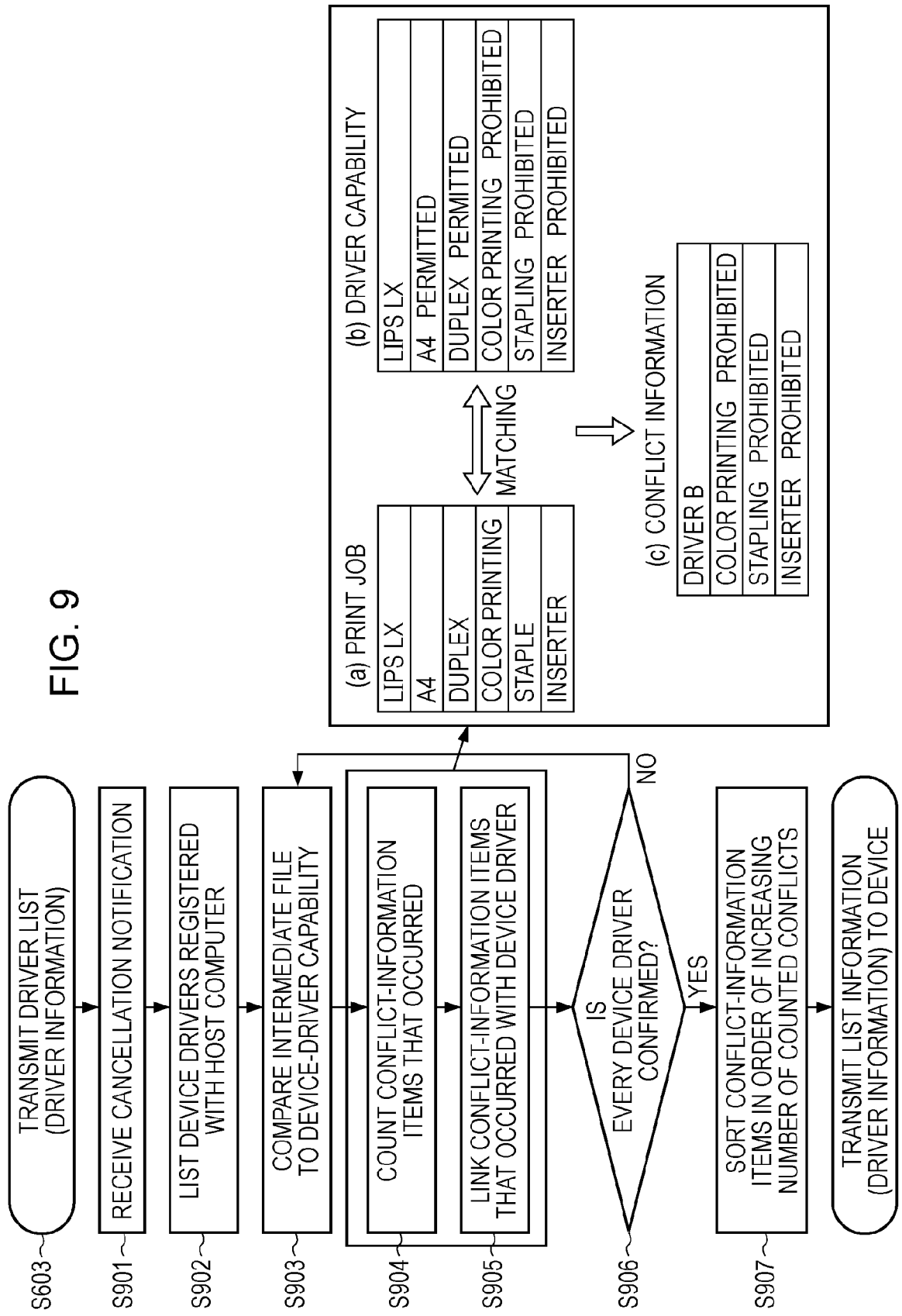
FIG. 9 is a flowchart showing details on the transmission of a driver list (driver information).

FIG. 9 shows details on the transmission of the list of the drivers used for the individual devices, the transmission performed at step S603. The bookbinding application 204 receives the cancellation notification transmitted from the control unit 502 of the device A at step S901. Then, the bookbinding application 204 acquires the list of the drivers used for the individual devices, the drivers being registered with the HDD 103 provided in the host computer 401, at step S902.

Further, the HDD 103 may be a local drive provided in a computer achieving the document-processing system of the above-described embodiment. If the HDD 103 is connected to the network, the HDD 103 may be a drive provided on the network.

Then, at step S903, the bookbinding application 204 compares the acquired device driver 206 to the structure information 303 included in the second intermediate file 205.

It is investigated whether the acquired device driver 206 has a capability sufficient to handle the structure information 303 and the presence or absence of the conflict. Further, information that can be the conflict is investigated.

Next, conflict-information items are counted at step S904, and information about the conflict investigation is linked with the driver 206 compatible with each device so that information about the conflict investigation is stored at step S905.

The conflict-investigation information is indicated by Part (c) shown in FIG. 9, for example, where part (c) is provided show a result derived from Parts (a) and (b) that are shown in FIG. 9.

Part (a) shows the list of functions necessary to execute a print job and conditions for performing the printing-and-outputting processing.

Part (b) shows the list of the capabilities of the driver. Part (C), which is obtained by matching Parts (A) and (B) to each other, is the list of items (conflict-information items) which occur as system errors when a print job requiring the conditions shown in Part (a) is executed by using a driver having the functions shown in Part (b).

At step S906, checking regarding the presence or absence of the conflict is performed for a device driver provided in the host computer.

After that, the conflict-information items are sorted in increasing order of the number of the conflicts counted at step S904, and driver information including the sorted conflict-information items is transmitted to the device A at step S907.

Figure 10:
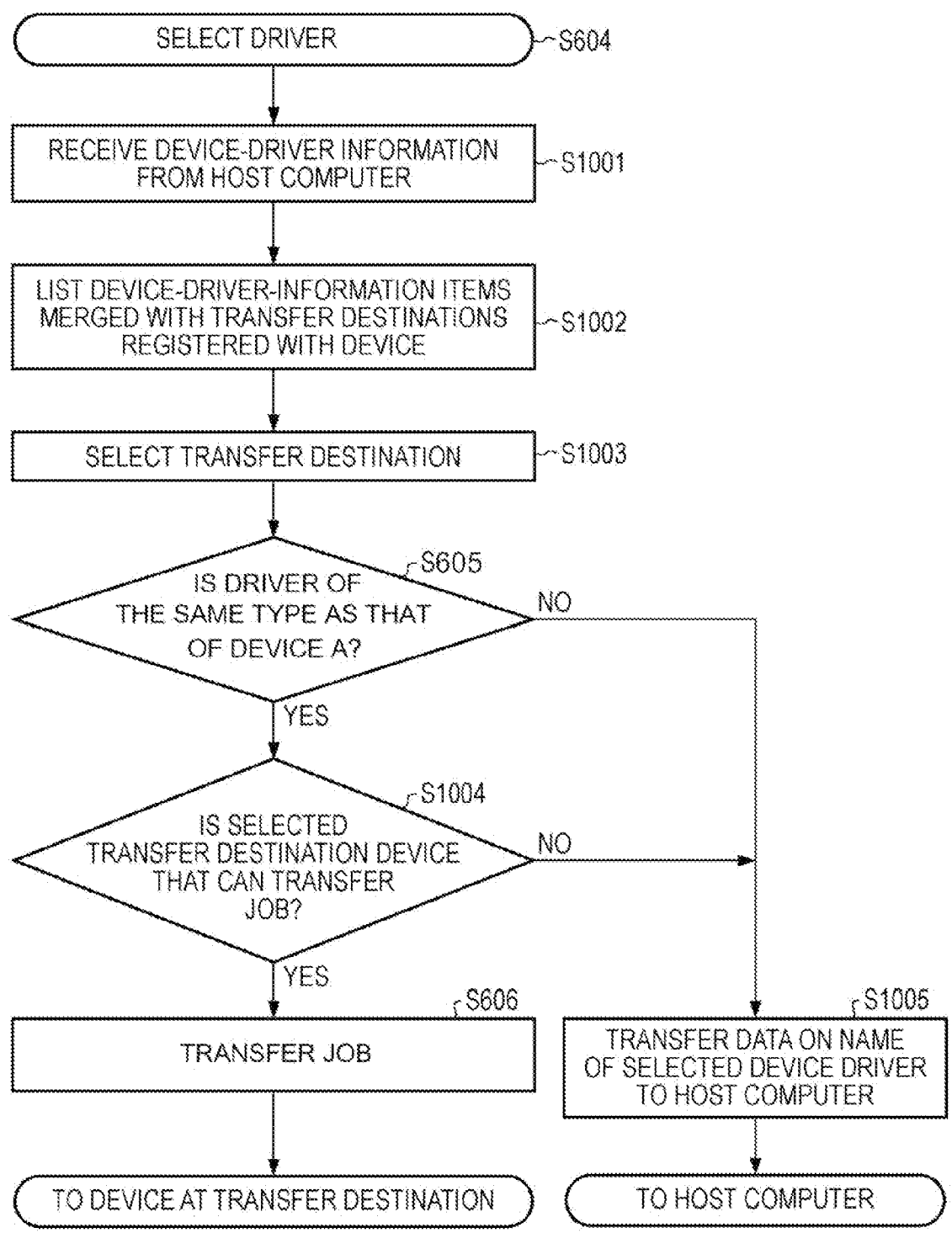
FIG. 10 is a flowchart showing details on the driver-list selection.

FIG. 10 is a flowchart showing details on steps S604, S605, and S606, the steps corresponding to from the driver selection to the print-job transfer.

At step S1001, the device A receives the driver information including the conflict-information items, the driver information being transmitted from the computer 401, through the NIC unit 501, and transmits the driver information to the control unit 502 of the device A.

Upon receiving the driver information, the control unit 502 displays the driver information including the conflict-information items, the driver information being transmitted from the host computer 401, on the operation unit 506 of the device A at step S1002.

Further, at the same time, the control unit 502 displays the candidates for the driver used for the device picked up as the transfer destination of the print job (the list of the registered drivers), the candidates being registered with the device A, on the operation unit 506 of the device A.

The driver information and the registered-driver list may be merged with each other for display. At step S1003, the operation unit 506 of the device A receives information about a driver specified as the transfer destination. After that, the operation unit 506 transmits the transfer-destination-specification information to the control unit 502 of the device A.

At step S605, upon receiving the transfer-destination-specification information, the device-control unit 502 determines whether the transfer destination specified at step S604 is the same model as the driver of the device A.

If the transfer destination specified at step S604 is not the same model as the driver of the device A, the processing advances to step S1005 so that data on the name of a device driver provided at the selected transfer destination is transmitted to the host computer 401. If the transfer destination is the same model as the driver of the device A, the processing advances to step S1004, so as to determine whether a device provided at the selected transfer destination can transfer the spooled print job. If the device transfers the print job with difficulty, the processing advances to step S1005 as descried above, so that the data on the name of the device driver provided at the selected transfer destination is transmitted to the host computer 401.

If the device can transfer the print job, the processing advances to step S606 so that the spooled print job is transferred to the device provided at the selected transfer destination. After transmitting information indicating that the transfer is finished and/or information indicating the data on the name of the selected device driver to the host computer 401, the control unit 502 of the device A deletes the print job.

Figure 11:
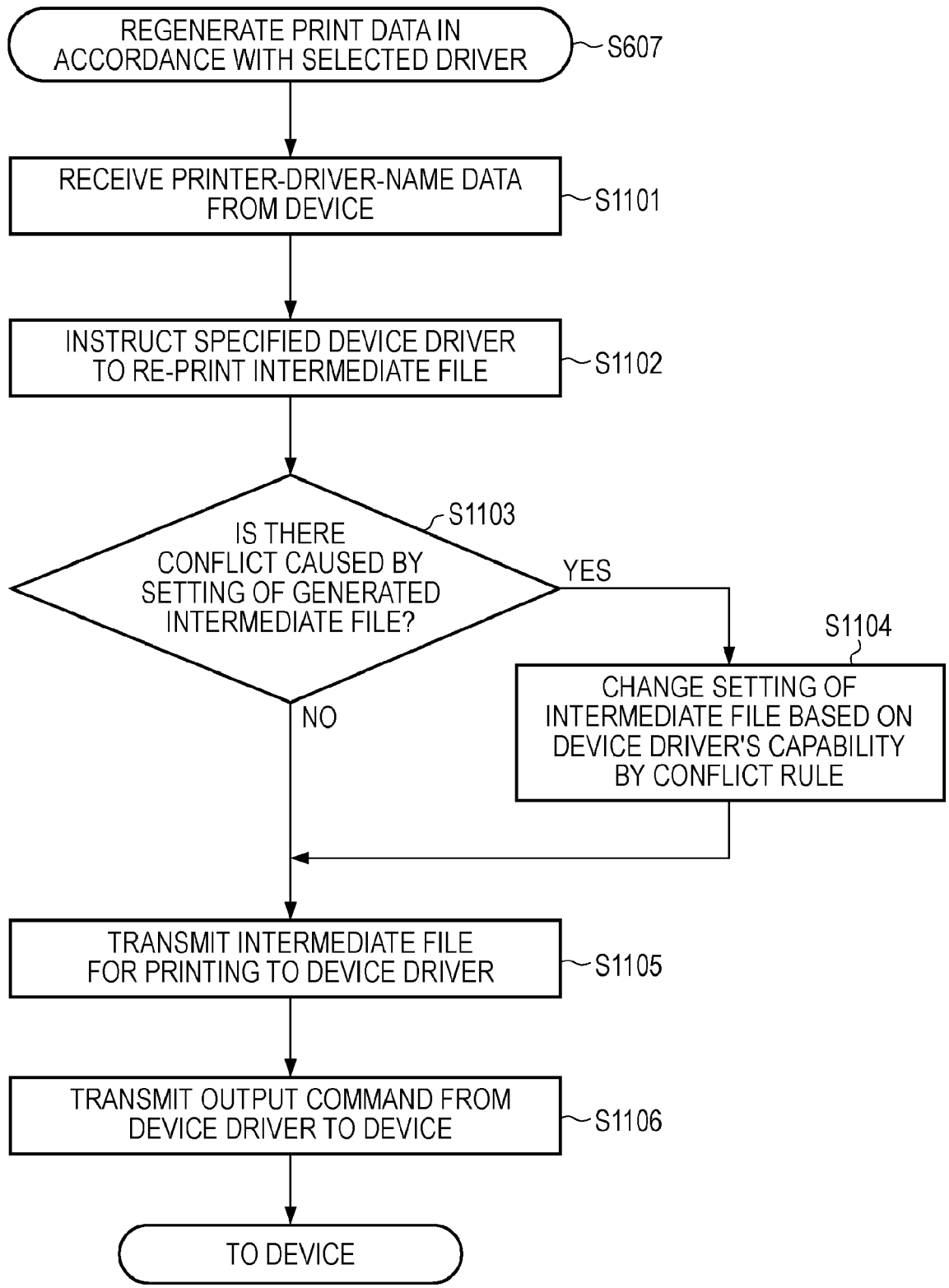
FIG. 11 is a flowchart showing details on an instruction to perform reprinting, the instruction being issued to a selected device.

FIG. 11 shows details on the instruction to perform reprinting, the instruction being issued to the selected device driver at step S607.

The bookbinding application 204 receives information about a device driver specified by the device A at step S1101.

At step S1102, the bookbinding application 204 instructs the device driver specified on the device side to perform the outputting-and-printing processing by using the second intermediate file 205 based on the received device-driver information.

If the structure information 303 of the second intermediate file 205 and the device C are selected in that circumstance, a conflict may occur in the device driver 206 of the selected device C.

In that case (YES at step S1103), the processing advances to step S1104 so that the structure information 303 is changed in accordance with the capability of the device driver 206 of the device C by a conflict rule. The conflict rule should be uniquely determined in the bookbinding application 204 in advance, and the rule is determined arbitrarily. The rule may be determined according to various methods.

If no conflicts occur and/or the structure information 303 is changed after the conflict occurs (NO at step S1103), the processing advances to step S1105 so that the second intermediate file 205 is transmitted to the device driver 206.

Then, the device driver 206 interprets the electronic-document file 302 based on the structure information 303 and transmits an output command to the device C at step S1106.

Figure 12:
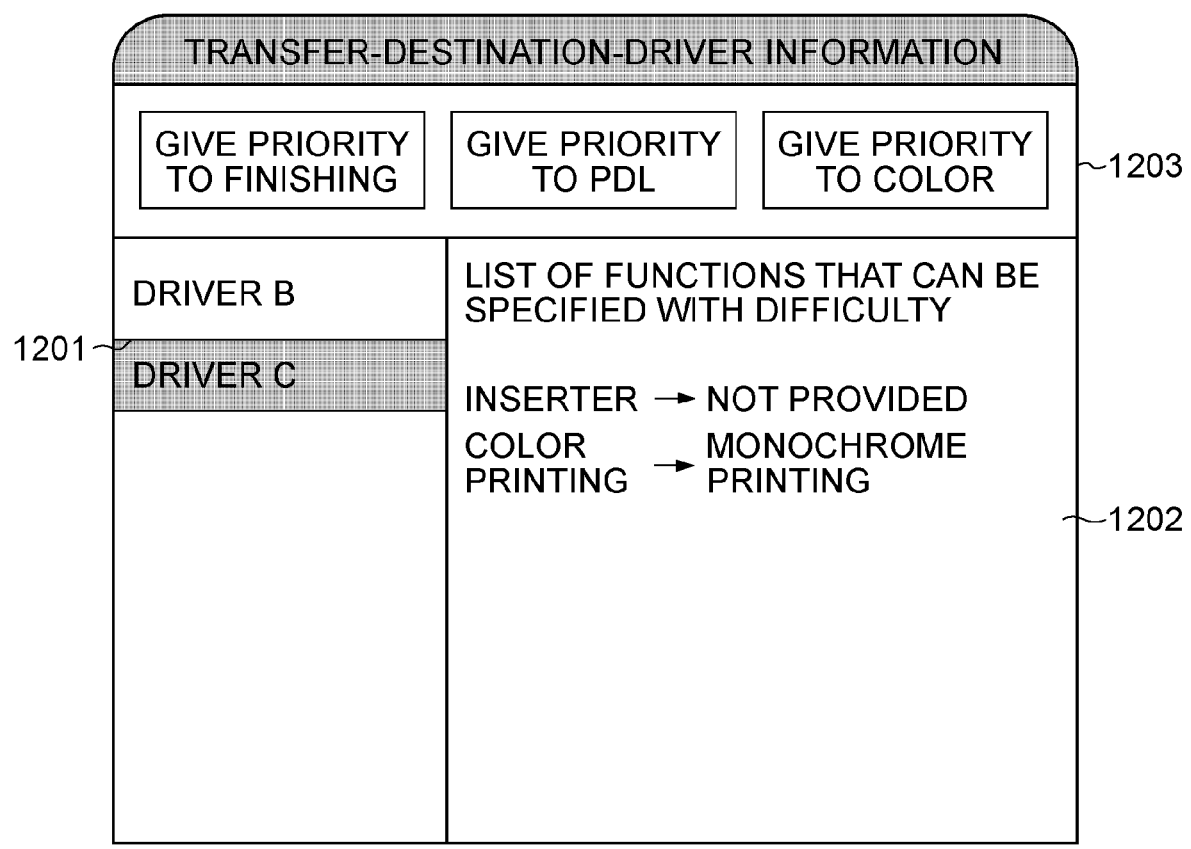
FIG. 12 shows an example GUI used to select a transfer-destination driver.

FIG. 12 shows an example graphical-user interface (GUI) used to specify the transfer destination displayed on the operation unit of the device A at step S1003.

In the GUI, information obtained by merging data on the driver list showing the transfer destinations with the driver information including the conflict-information items is shown.

On a driver list 1201, the user can view the candidates for the driver used for the device picked up as the transfer destination (the registered-driver list), the candidates being registered with the device A, and the driver list on which data is transmitted from the host computer 401.

A warning-display area 1202 is provided to display the list of functions that can be specified with difficulty, that is, the conflict-information items. The conflict-information items corresponding to the individual devices are displayed in the warning-display area 1202.

A part which becomes different from the original result of the outputting-and-printing processing when the conflict-information items acquired at step S905 are displayed, and the print job is transferred to the transfer destination selected at step S1201 and the reoutputting-and-reprinting processing is performed is displayed.

A sort-order-selection button 1203 is provided to set the sort order. The sort-order-selection button 1203 can change the priority order of the displayed transfer destinations based on the weight detected from the counting performed at step S904.

According to the above-described embodiment, the cancellation of the print instruction and the transmission of the instruction to perform the reprinting to a different device are performed at the same time through the device from which the user issues the first print instruction, which saves the user the trouble of going back to the host computer and issuing the instruction to perform the reprinting.

Further, it becomes possible to select a device which is not operating in cooperation with the device from which the user issues the first print instruction, as a device functioning as the destination of the reoutputting and the reprinting.

Further, since the reprint instruction can be issued through the host computer 401, the outputting-and-printing processing can be performed via the most appropriate driver again, which makes it possible to generate the most appropriate print data for a device which actually performs the outputting-and-printing processing.

Further, the list of the reoutputting-and-reprinting destinations is presented on the device from which the user issues the first print instruction and the user is made to select a device functioning as the reoutputting-and-reprinting destination from the above-described list. Consequently, it becomes possible to determine a device to which the user issues the reoutputting-and-reprinting instruction considering the result of the outputting-and-printing processing performed at the reoutputting-and-reprinting destination.

The time where the cancellation is performed at step S602 may not be before outputting and printing of the job are started.

Figure 13:
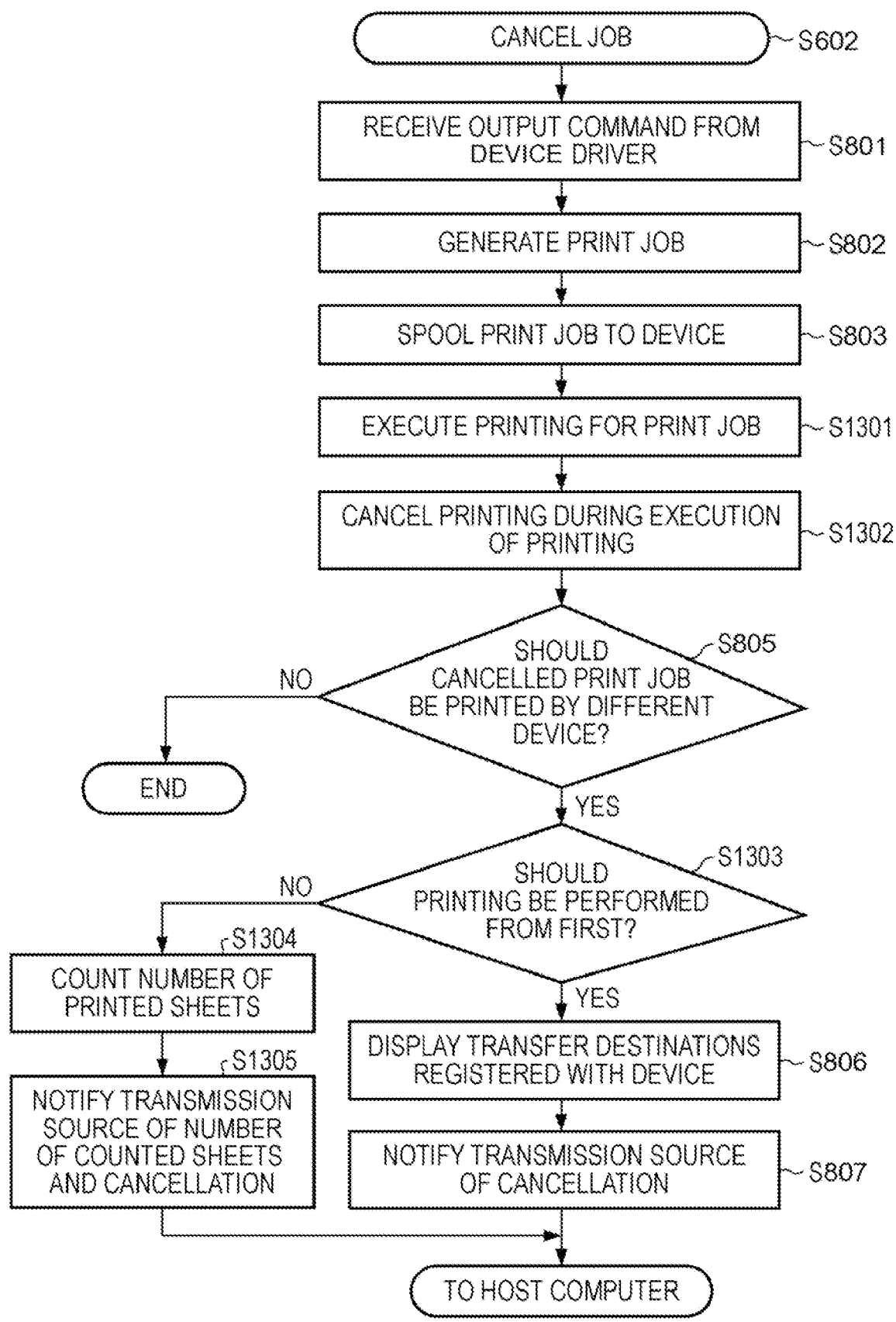
FIG. 13 is a flowchart showing the case where the job cancellation is made during the execution of printing in detail.

The transfer-destination device can be specified in a like manner even though the cancellation is made during the execution of the outputting-and-printing processing, namely, the execution of the print job. FIG. 13 shows a flowchart describing the processing procedures corresponding to step S602 performed in the above-described circumstances.

Figure 8:
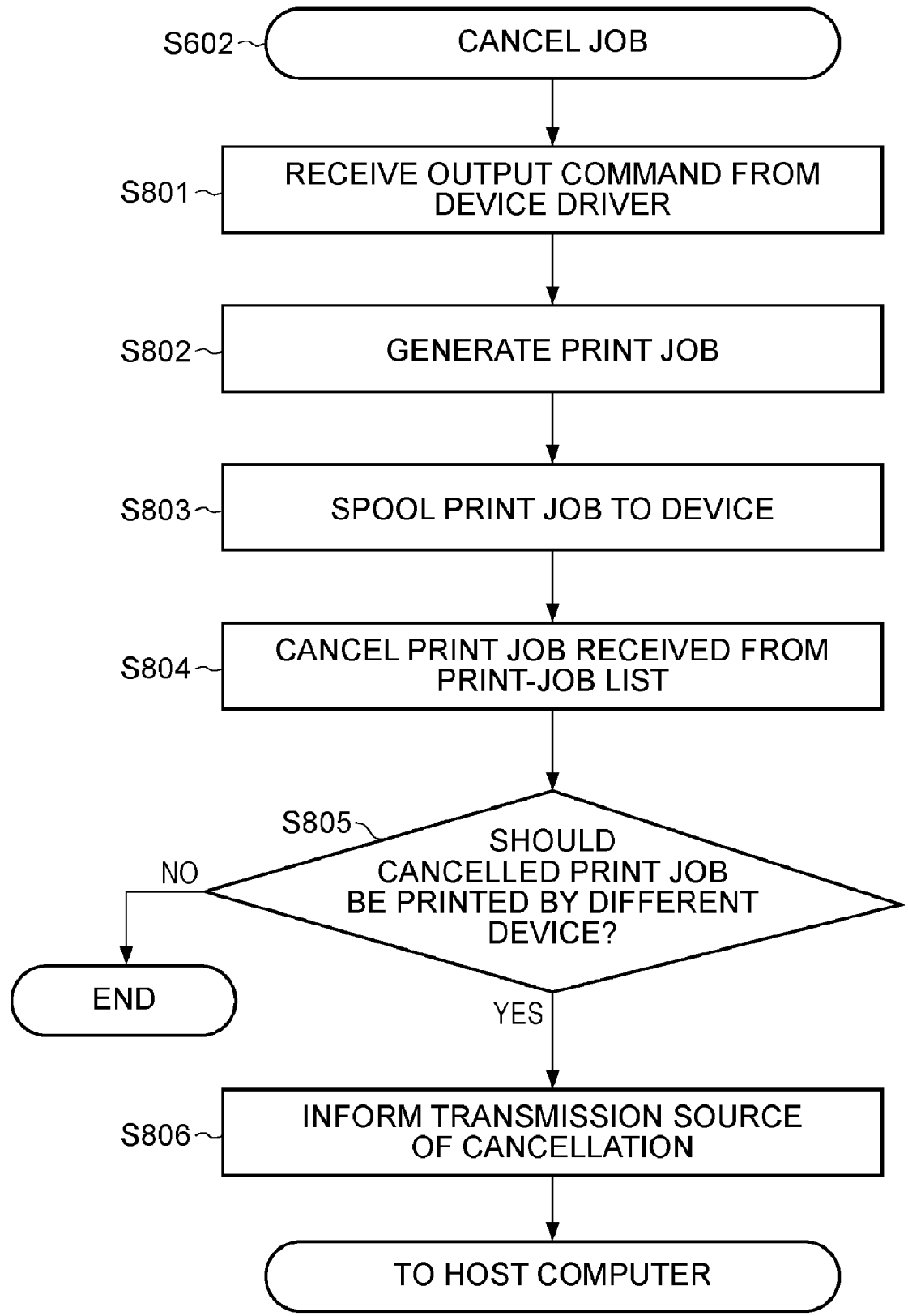
FIG. 8 is a flowchart showing details on the job cancellation.

Since the processing procedures corresponding to step S602 to step S803 where the print job is spooled are the same as step S602 to step S803 shown in FIG. 8, the description thereof is omitted.

At step S1301, the spooled data is transmitted to the output-image-processing unit 503, subjected to the image processing and printed through the printer unit 504.

Then, at step S1302, the operation unit 506 of the device A, where the first outputting-and-printing instruction is transmitted to the operation unit 506, is instructed to cancel the print instruction by the user during the printing.

The operation unit 506 instructed to cancel the print instruction transmits information indicating that the print instruction is cancelled to the control unit 502 of the device A.

Upon receiving the above-described information, the device-control unit 502 transmits cancellation information to the printer unit 504 so that the printing is stopped.

After the cancellation is made, the processing advances to step S805. If the outputting-and-printing processing should be performed by a different device, the processing advances to step S1303, so as to determine whether the printing should be performed from the first page of the job and/or whether pages that had already been output and printed should be omitted.

If the outputting-and-printing processing should be performed from the first page of the job (YES at step S1303), the process advances to step S806 and the same processing procedures as those performed when the cancellation is made before the print job is spooled are continued, as shown by step S806.

If the outputting-and-printing processing is performed by a different device so that the outputting-and-printing processing is continued at some midpoint thereof, the processing advances to step S1304 so that the number of sheets that had already been output and printed through the control unit 502 of the device A is counted. Information about the result of the above-described counting is stored, as number-of-printing information.

Then, the host computer 401 is notified of the number-of-printing information and the print-job-cancellation information at step S1305.

FIG. 14 shows a detailed flowchart of processing procedures performed by a driver-list-transmission unit (S603) in the case where the print job is transferred to a different device such as the device B and/or the device C at some midpoint of the outputting-and-printing processing.

The processing procedures shown in the flowchart of FIG. 14 will be described even though the description of the same steps as those shown in FIG. 9 is omitted. The bookbinding application 204 receives the cancellation notification and the number-of-printing information indicating the number of the output and printed sheets, the cancellation notification and the number-of-printing information being transmitted from the device A, at step S1401. After that, the bookbinding application 204 acquires the list of the drivers used for the devices, the drivers being registered with the host computer 401 at step S902.

Then, at step S1402, the bookbinding application 204 confirms whether the structure information 303 of the second intermediate file 205 includes settings applied to the entire electronic-document file 302, for example, settings of stapling, saddle-stitch bookbinding, etc.

The existence of the settings of the entire electronic-document file 302 is determined at step S1403. If the settings exist, the processing advances to step S1404 so that settings applied to the entire second intermediate file 205 are cancelled without fail.

Then, at step S1405, the structure information 303 is corrected so that pages after the page that had been output and printed are output and printed, and the second intermediate file 205 is regenerated.

Then, at step S903, the regenerated second intermediate file 205 is compared to the capability of the device driver and data on the driver list is transmitted to the device A. The steps thereafter are the same as those performed when the cancellation is made before the outputting-and-printing processing is performed.

Consequently, advantages described above can be achieved even though the outputting-and-printing processing is in progress in some embodiments.

Further, if a device to which data is output is changed during the outputting-and-printing processing, it becomes possible to select either restarting the outputting-and-printing processing from some midpoint thereof or reoutputting and reprinting the entire data from the first.

A processing method provided to store a program making the components of the above-described embodiments operate, so as to achieve the functions of the above-described embodiments, in a storage medium, read the stored program as code, and execute the code through a computer also falls within the scope of the above-described embodiments. Further, not to mention the storage medium storing the above-described program, the program itself falls within the scope of the above-described embodiments.

The above-described storage medium may include, for example, a floppy (registered trademark) disk, a hard disk, an optical disk, a magneto-optical disk (MO), a compact disk (CD)-read only memory (ROM), a magnetic tape, a nonvolatile memory card, and a ROM.

Further, without being limited to the program stored in the above-described storage medium, where the program executes processing singly, a program which operates on an OS and executes the operations of the above-described embodiments in concert with different software, the function of an expansion board also falls within the scope of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-300759 filed on Nov. 20, 2007, which is hereby incorporated by reference herein in its entirety.

What is claimed is:

1. An information-processing apparatus comprising:
a print-job-transmission unit operable to transmit a print job to a first image-processing apparatus; and
a driver-information-transmission unit configured to transmit at least one driver-information item including a driver list, which is a list of at least one driver existing on the information-processing apparatus, to the first image-processing apparatus upon receiving cancellation information indicating that the transmitted print job is cancelled by the first image-processing apparatus,
wherein the at least one driver-information item includes data on a result of a comparison made between structure information set for the print job and structure information that can be handled by the driver existing on the information-processing apparatus,
wherein in a case that a plurality of driver-information items including the comparison-result data are transmitted to the first image-processing apparatus, the driver-information items are sorted in increasing order of a number of conflicts which result from the comparison,
wherein in a case that the print job is transmitted from the first image-processing apparatus to which the print job is transmitted to a second image-processing apparatus different from the first image-processing apparatus, a presence or an absence of the conflict is determined, the conflict existing between structure information of a print job that can be handled by a driver used by the second image-processing apparatus and the structure information set for the print job, and
wherein in a case that the conflict is present, the structure information set for the print job is changed, and
wherein in a case that the conflict is absent, the print job is transmitted to a driver compatible with the second image-processing apparatus without changing the structure information set for the print job.

2. An information-processing method comprising:
transmitting a print job to a first image-processing apparatus; and
transmitting at least one driver-information item including a driver list, which is a list of at least one driver existing on an information-processing apparatus, to the first image-processing apparatus upon receiving cancellation information indicating that the transmitted print job is cancelled by the first image-processing apparatus,
wherein the at least one driver-information item includes data on a result of a comparison made between structure information set for the print job and structure information that can be handled by the driver existing on the information-processing apparatus,
wherein in a case that a plurality of driver-information items including the comparison-result data are transmitted to the first image-processing apparatus, the driver-information items are sorted in increasing order of a number of conflicts which result from the comparison,
wherein in a case that the print job is transmitted from the first image-processing apparatus to which the print job is transmitted to a second image-processing apparatus different from the first image-processing apparatus, a presence or an absence of the conflict is determined, the conflict existing between structure information of a print job that can be handled by a driver used by the second image-processing apparatus and the structure information set for the print job, and
wherein in a case that the conflict is present, the structure information set for the print job is changed, and
wherein in a case that the conflict is absent, the print job is transmitted to a driver compatible with the second image-processing apparatus without changing the structure information set for the print job.

3. A non-transitory computer-readable storage medium storing a program for making a computer execute a method of controlling an information-processing apparatus connected to an image-processing apparatus, the method comprising:
transmitting a print job to a first image-processing apparatus; and
transmitting at least one driver-information item including a driver list, which is a list of at least one driver existing on the information-processing apparatus, to the first image-processing apparatus upon receiving cancellation information indicating that the transmitted print job is cancelled by the first image-processing apparatus,
wherein the at least one driver-information item includes data on a result of a comparison made between structure information set for the print job and structure information that can be handled by the driver existing on the information-processing apparatus,
wherein in a case that a plurality of driver-information items including the comparison-result data are transmitted to the first image-processing apparatus, the driver-information items are sorted in increasing order of a number of conflicts which result from the comparison,
wherein in a case that the print job is transmitted from the first image-processing apparatus to which the print job is transmitted to a second image-processing apparatus different from the first image-processing apparatus, a presence or an absence of the conflict is determined, the conflict existing between structure information of a print job that can be handled by a driver used by the second image-processing apparatus and the structure information set for the print job, and
wherein in a case that the conflict is present, the structure information set for the print job is changed, and
wherein in a case that the conflict is absent, the print job is transmitted to a driver compatible with the second image-processing apparatus without changing the structure information set for the print job.

* * * * *